United States Patent [19]

Elko et al.

[11] Patent Number: 5,463,736
[45] Date of Patent: Oct. 31, 1995

[54] COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF

[75] Inventors: David A. Elko, Poughkeepsie; Jeffrey A. Frey, Fishkill; Audrey A. Helffrich, Poughkeepsie; John F. Isenberg, Jr., Poughkeepsie; Brian B. Moore, Poughkeepsie; Jeffery M. Nick, Fishkill; Michael D. Swanson, Poughkeepsie; Joseph A. Williams, Poughkeepsie, all of N.Y.

[73] Assignee: International Business Machines Corporation, Armonk, N.Y.

[21] Appl. No.: 324,447

[22] Filed: Oct. 18, 1994

Related U.S. Application Data

[63] Continuation of Ser. No. 860,646, Mar. 30, 1992, abandoned.

[51] Int. Cl.[6] .................................................. G06F 13/14
[52] U.S. Cl. .................. 395/848; 395/650; 395/200.08; 364/229.4; 364/238.1; 364/238.2; 364/DIG. 1
[58] Field of Search ................................ 395/200, 275, 395/575, 725

[56] References Cited

U.S. PATENT DOCUMENTS

| | | | |
|---|---|---|---|
| 4,396,984 | 8/1983 | Videki et al. | 395/275 |
| 4,545,011 | 10/1985 | Lyon et al. | 364/200 |
| 4,718,002 | 1/1988 | Carr | 364/200 |
| 5,170,472 | 12/1992 | Cwiakala et al. | 395/275 |
| 5,191,651 | 3/1993 | Halim et al. | 395/200 |
| 5,191,989 | 9/1993 | Johnson et al. | 395/600 |
| 5,193,152 | 3/1993 | Smith | 395/200 |
| 5,218,697 | 6/1993 | Chung | 395/650 |
| 5,224,205 | 6/1993 | Dinkin et al. | 395/200 |

OTHER PUBLICATIONS

SA22-7203-00, Enterprise Systems Architecture/390 ESCON Channel-to-Channel Adapter.
GA23-0354-1, Using, Enterprise Systems Connection Directors.
GC30-3073-3, Systems Network Architecture, Technical Overview.

*Primary Examiner*—Thomas C. Lee
*Assistant Examiner*—Sang Hui Kim
*Attorney, Agent, or Firm*—Floyd A. Gonzalez

[57] ABSTRACT

A message path mechanism in a network having central processing complexes (CPCs) joined by message paths to a coupling facility. The coupling facility locates message paths for sending messages from one CPC to another and for sending messages between the coupling facility and one or more of the CPCs. A message path status table is provided having an entry for each of the message paths. Each entry has an indicator indicating whether its message path is active or inactive. multiple connections between the coupling facility and systems in the CPCs are registered in the coupling facility. Also provided is a mechanism for validating that each message path is connected properly such that if a message path is disconnected and then reconnected to a CPC, the validation mechanism insures that the message path has been reconnected correctly.

22 Claims, 11 Drawing Sheets

COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF

This application is a continuation of application Ser. No. 07/860,646, filed Mar. 30 1992, now abandoned.

BACKGROUND OF THE INVENTION

The present invention relates to a message path mechanism in a coupled system environment having central processing complexes (CPCs) and a coupling facility, and more particularly relates to a message path mechanism wherein, when the coupling facility receives a command from one CPC in the network, the coupling facility verifies that commands other than pathing commands, are received over an active path. The received command may require commands to be addressed to another CPC, the coupling facility locates a proper message path to send the resulting command to the other CPC.

A channel-to-channel adapter (CTC) is described in SA22-7203-0, ESA/390 ESCON Channel-to-Channel Adapter, available from IBM Corp. of Armonk, N.Y. A command received by the CTC control unit is forwarded to the system that previously requested reception by issuing a prepare command. The prepare command must be reissued after each command reception. In the present invention, signal delivery in the activation of a message path is sufficient preparation for receiving a command. Commands can continue to be received so long as the message path remains active. The CTC raises an I/O interrupt. In the present invention, delivery of a command does not cause program interruption.

The partitioning of ports of the Escon director is described in GA23-0354-0, ESCON Director User's Guide, available from IBM Corp. Command information received on a port can only be routed to one of the ports defined in the same partition. Commands are sent in command frames wherein additional routing information is also provided in a header attached to each command frame. The routing is limited to a single destination port. In the present invention, signal delivery maintains complete routing information in a message path table, and one of several paths may be selected to send the command.

Routing tables are defined in GC30-3073-2, Systems Network Architecture Technical Overview, available form IBM Corp., to guide the delivery of information in a network. The routing tables are generated at each node in the network by a network operator and must be manually maintained. In the present invention, a message-path status table is dynamically maintained by the program and the coupling facility as configuration changes occur.

SUMMARY OF THE INVENTION

Miscabling potential is inherent when fiber-optic links are used in networks of CECs and I/O equipment. Miscabling potential increases when patch panels appear in the network. The mechanisms described here permit the system to deal with miscablings that can otherwise lead to unreliable operations.

Some operations executed by a structured external storage (SES) facility are designed to generate signals to a system image (PR/SM supported partition) running in an attached CEC. Three signals are generated; cache cross invalidates, list-state transition notifications, and fencing operations. Fiber optic links as disclosed in U.S. patent application Ser. No. 07/839,652 filed Feb. 20, 1992, now U.S. Pat. No. 5,412,803 for "Configurable, Recoverable Parallel Bus" by Bartow et al. and U.S. patent application Ser. No. 07/839,652 filed Feb. 20, 1992, now U.S. Pat. No. 5,412,803 for "High Performance Intersystem Communications for Data Processing Systems" by Bartow et al., both incorporated herein by reference, carry the signals from the SES facility to the CEC. The mechanism described herein provides the ability to deliver signals by means of routing information placed in the SES facility by the program to direct the signals to the correct target system. The routing information is program and coupling facility modifiable to account for configuration changes due to link errors, system failures, system initializations, and CEC partitioning.

It is a primary object of the present invention to provide a message-path mechanism and apparatus for programming to validate and ensure continuous reliable operation in a hardware configuration that includes optical fibers and patch panels.

It is another object of the present invention to provide a message-path identifier assigned to each source of commands.

It is another object of the present invention to provide message-path identifiers and node descriptors assigned by a coupling facility to message path sources of commands that may be retrieved and associated with subchannels and channel path identifiers (CHPIDs) used by the central processing units (CPUs) in a coupled systems configuration.

It is another object of the present invention to provide for determining which message paths are cabled properly for reliable coupling operations.

It is another object of the present invention for enabling at the coupling facility only those message paths which are cabled properly.

It is another object of the present invention to associate disruptions with message-path identifiers assigned by the coupling facility.

It is another object of the present invention for placing message paths in an inactive state with respect to normal processing of commands received on message paths associated with link disruptions.

It is another object of the present inventin for rejecting all commands, other than pathing commands, received over an inactive path.

It is another object of the present invention for sending a command to a target system image.

It is another object of the present invention for including a system identifier in the routing information allowing commands to be targeted to the correct system image.

It is another object of the present invention to provide programming specifications of a system identifier that establishes a logical name for the target system that is not affected by link failures or physical reconfiguration.

It is another object of the present invention for a program running in the system image to select and deactivate the message paths used by a coupling facility for sending commands to the system image.

These and other objects of the present invention will be apparent from the following more particular description of the preferred embodiment of the invention as illustrated in the drawings.

DESCRIPTION OF A PREFERRED EMBODIMENT

Figure 1:
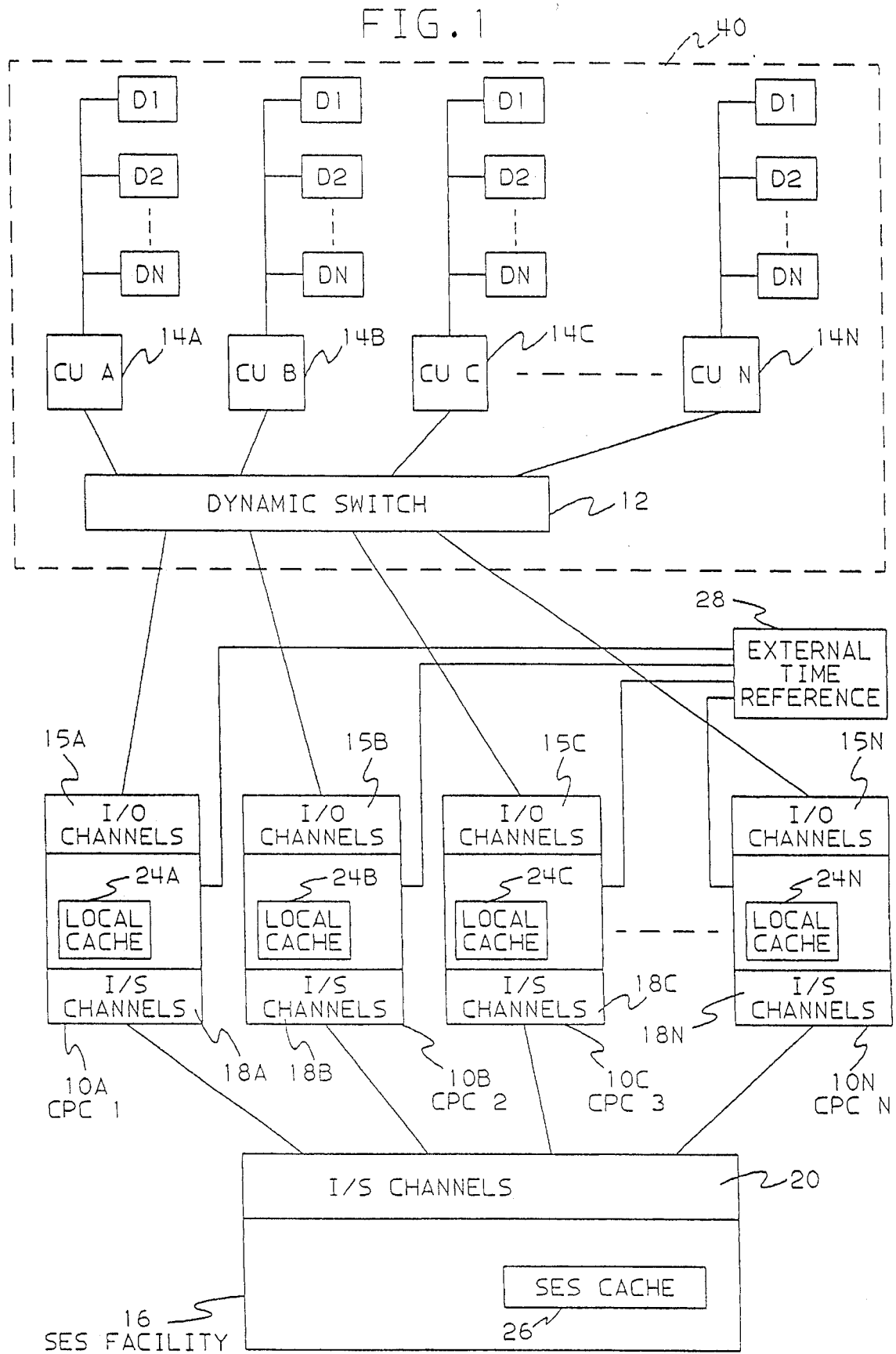
FIG. 1 is a block diagram of a data processing system of the present invention having multiple CPCs connected to an I/O system and a SES facility.

FIG. 1 is a block diagram of a data processing system using the present invention. The system of FIG. 1 includes multiple central processing complexes (CPCs) 10A through 10N which are connected to an input/output (I/O) system including a dynamic switch 12 controlling access to multiple I/O control units 14A through 14N. Each of the control units 14A through 14N controls one or more direct access storage devices (DASD) D1 through DN as shown. The dynamic switch 12 may be an ESCON Director dynamic switch available from IBM Corporation, Armonk, N.Y. Such a dynamic switch is disclosed in U.S. No. 5,107,489 for Switch and its Protocol for Making Dynamic Connections issued Apr. 21, 1992 and assigned to the owner of the present invention, which application is incorporated herein by reference. As is known, I/O commands and data are sent from a CPC to an I/O control unit through the dynamic switch 12 by means of I/O channels 15A through 15N of the respective CPCs 10A through 10N. Channel programs for a particular I/O channel are established by channel command words (CCWs) as is well known in the art.

Each of the CPCs 10A–10N are connected to a structured-external-storage (SES) facility 16, which contains storage accessible by the CPCs and which performs operations requested by programs in the CPCs. Each CPC 10A–10N contains intersystem (I/S) channels 18A–18N, respectively, which are connected to I/S channels 20 in the SES facility 16. The SES facility 16 is also referred to herein as a coupling facility. Even though only one SES facility 16 is shown in the embodiment of FIG. 1, it will be understood that multiple SES facilities may be provided for, each with its own I/S channels and message paths connected to all or some subset for the CPCs 10A–10N. It will be understood that the I/O channels 15 are part of the well known channel subsystem (CSS), which CSS also includes the I/S channels 18 disclosed herein, even though channels 15 and 18 are shown separately in FIG. 1 for convenience.

Each of the CPCs 10A–10N has a local cache 24A–24N, respectively, and the SES facility 16 contains one or more SES caches 26. The DASD devices D (referred to herein collectively as DASD 40), the local caches 24A–24N and the SES cache 26 form a three-level storage hierarchy. The lowest level of storage is the DASD 40, the intermediate level of storage is the SES cache 26, and the highest level is the local caches 24A–24N. The local caches 24A–24N are many times referred to herein as the local cache 24.

Figure 7:
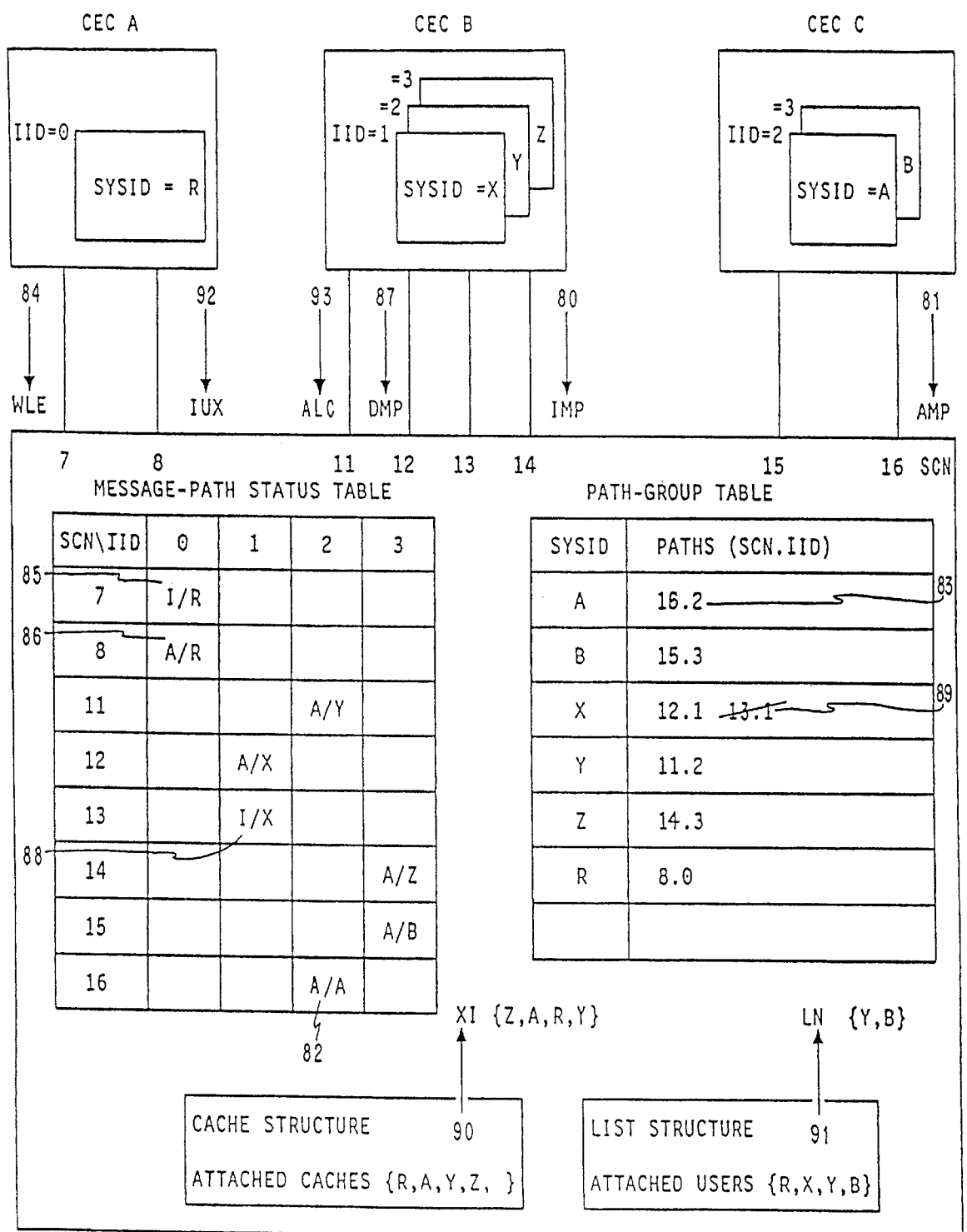

FIG. 7 is a block diagram of the present invention showing a configuration having three CECs connected to a SES facility.

Each of the CPCs 10A–10N may be an IBM system following the Enterprise Systems Architecture/390 Principles of Operation as described in IBM publication SA22-7201-00. Each of the CPCs 10A–10N includes one or more central processing units (CPUs) which executes an operating system, such as IBM's MVS operation system, for controlling execution of programs for processing data, as is well known. One such program performs many of the SES operations mentioned herein. This program is referred to herein as "the program." Individual instructions of the program are identified as "CPU instructions."

An external time reference (ETR) 28 provides time stamps of control information to be written into a log to document recovery from failures, backing out of undesired operations, and for audit trails. The ETR 28 synchronizes the time clocks (not shown) of the CPCs 10A–10N to a precision equal to or less than the duration of the shortest externally visible operation, and uses fiber optic interconnect cables. The ETR 28 provides for cable length propagation time differences where those differences are important in order to be able to maintain synchronization to within the length of the mentioned external operation.

Figure 2:
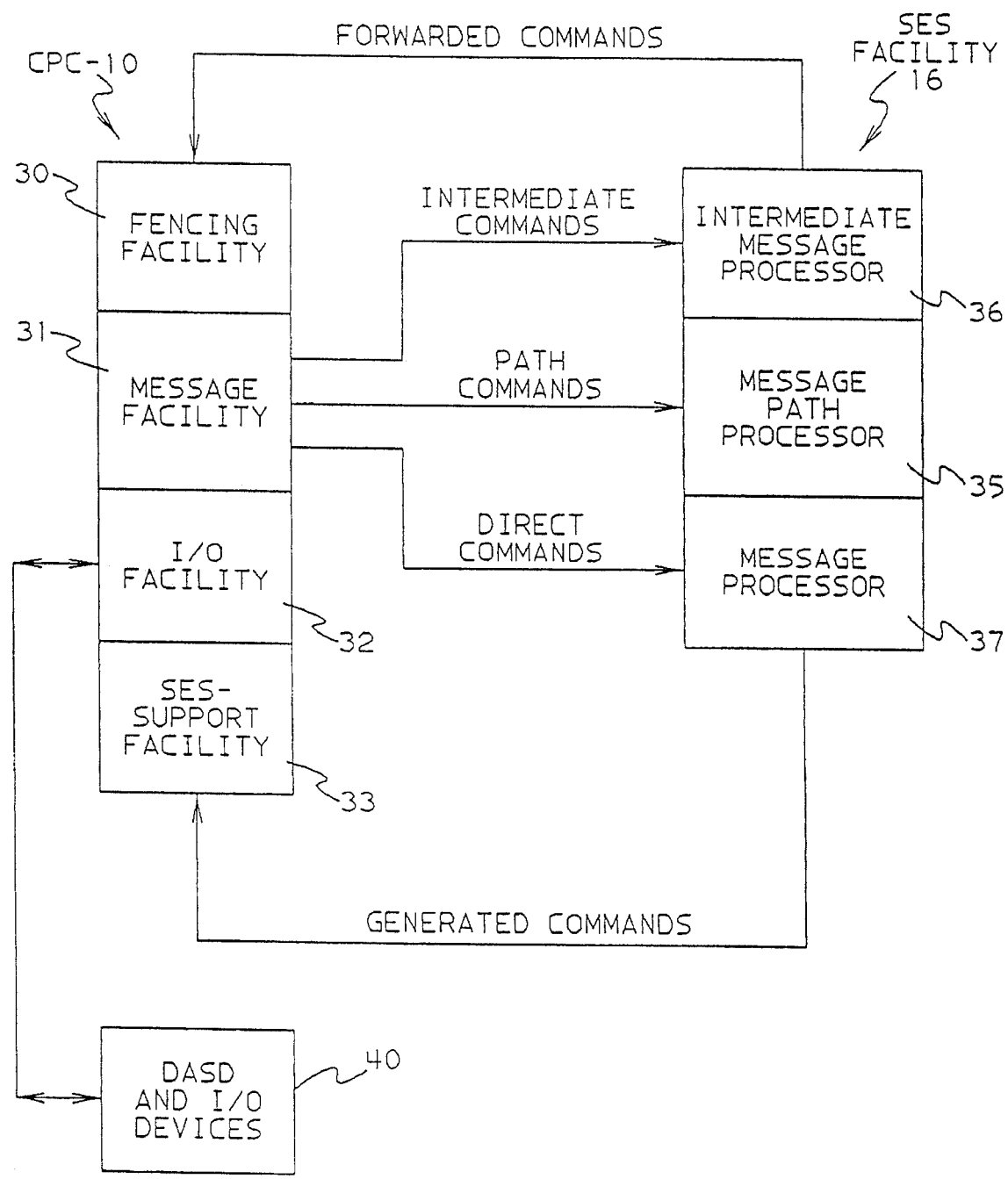
FIG. 2 is a portion of the system of FIG. 1 and shows several facilities of a single CPC connected to processors of the SES facility.

FIG. 2 shows a single CPC 10 connected to the SES facility 16. The CPC 10 includes a fencing facility 30, a message facility 31, an I/O facility 32 and a SES-support facility 33. The SES facility 16 includes a message-path processor 35, an intermediate-message processor 36, and a message processor 37. The message-path processor 35 executes message-path commands and performs message-path functions. The intermediate-message processor 36 forwards intermediate message commands to remote message processors such as the fencing facility 30. The message processor 37 supports structured storage of the list and cache type, to be explained herein in connection with FIG. 4.

Figure 3:
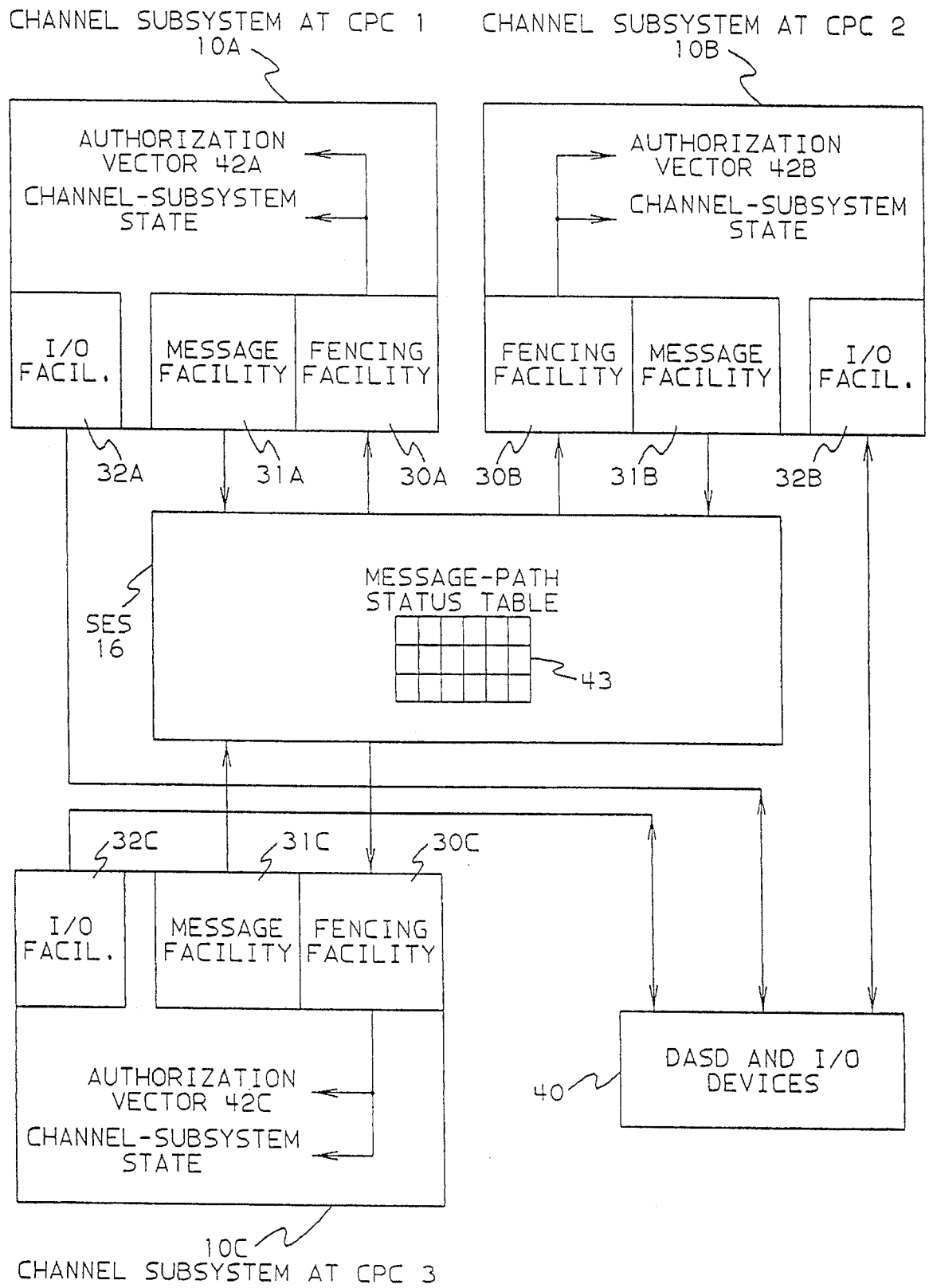
FIG. 3 is another portion of the system of FIG. 1 and shows an intermediate message processor of the SES facility and three CPCs.

The I/O facility 32 performs I/O operations and executes channel programs with DASD and I/O devices represented in FIGS. 2 and 3 at 40. The START SUBCHANNEL instruction is used to initiate an I/O operation in a manner well known in the art. The I/O facility is described the aforementioned ESA/390 Principles of Operation.

The message facility 31 performs message operations with the SES processors 35, 36 and 37, and with the fencing facilities 30. The SEND MESSAGE instruction is used to initiate a message operation with a SES facility 16 or fencing facility 30. This facility and instruction are disclosed in U.S. patent application Ser. No. 07/860,380 filed Mar. 30, 1992, now abandoned for "Communicating Messages Between Processors and a Coupling Facility" by D. A. Elko et al incorporated herein by reference.

The fencing facility 30 executes commands that are received from other message facilities via the intermediate message processor. The commands are often issued by programs running on other CPCs. The commands operate on an authorization vector and a channel-subsystem-state indication, to be explained.

The SES-support facility 33 performs SES functions in the CPC 10 and executes commands generated by the message processor 37 in the SES facility 16.

Five separate types of message commands are defined and communicated between the hardware components of the SES facility 16 and the CPC 10. Path commands are communicated from the message facility 31 to the message path processor 35 via the SEND MESSAGE instruction over a selected message path associated with the subchannel. Path selection is performed by the control program of the CPC 10. Three path commands are defined: identify message path, activate message path and deactivate message path.

The program uses the SEND MESSAGE (SMSG) instruction to initiate an operation by the message processor 37 of FIG. 2. Execution of the message-processor operation is accomplished by sending command information to the SES facility 16 and returning response information summarizing the result. Additionally, the command may specify the transfer of data from main storage to SES storage, a SES-write operation, or the transfer of data from SES storage to main storage, a SES-read operation.

Direct commands are communicated from the message facility 31 to the message processor 37 via the SEND MESSAGE instruction over a selected message path associated with the subchannel. Path selection is performed by the channel subsystem or CPU and the direct command must be communicated on an active message path. The direct command may also include a data transfer operation. Direct commands are not forwarded, but may generate one or more commands. The classes of direct commands include: global commands, retry-buffer commands, cache-structure commands, and list-structure commands.

Generated commands are communicated from the message processor 37 to the SES-support facility 33 in a designated CPC over a message path selected by the message processor 37 from the path group for the system. The SES support facility comprises a processor for execution of the generated commands communicated over a message path. Path selection is performed by the message-path processor 35. No data transfer occurs. Generated commands must be communicated on an active message path. The generated commands include the cross-invalidate and list-notification commands, to be explained. Depending on the command, processing of the generated commands may or may not complete prior to completion of the associated direct command. However, a direct command does not complete before the action intended by the generated command is assured.

Intermediate commands are communicated for the message facility 31 to the intermediate-message processor 36 via the SEND MESSAGE instruction over a selected message path associated with the subchannel. Path selection is performed by the channel subsystem or CPU. Intermediate fencing commands are forwarded to the fencing facility 30 in a designated CPC.

Forwarded commands are communicated from the intermediate message processor 36 to a message processor. Path selection is performed by the message-path processor 35. Forwarded commands must be communicated on an active message path. Exactly one forwarded command is processed for each intermediate command that is received at the intermediate message processor 36. Processing of the forwarded command must complete prior to completion of the associated intermediate command.

Command execution charactistics at the SES facility 16 are disclosed in U.S. patent application Ser. No. 07/860,803 filed Mar. 30, 1992 now U.S. Pat. No. 5,377,739 for "Method and Apparatus for Coupling Data Processing Systems" by D. A. Elk et al. incorporated herein by reference.

All communications to a SES facility 16 from the CPC 10 may use the same message path, depending on the configuration, regardless of whether the destination is the message processor 37, message-path processor 35, or intermediate-message processor 36. All communications from the SES facility 16 to a CPC 10 may also use the same set of message paths, depending on the configuration, regardless of whether the destination is the fencing facility 30 or the SES-support facility 33.

The fencing facility 30 is a component of the ESA/390 channel subsystem. Fencing commands are issued by CPU programs, but they are executed by fencing facilities. Command execution involves fetching request operands from main storage, operating on storage objects at the fencing facility, and storing response operands in main storage.

Eight mechanisms exist for message paths: identification, activation, testing, deactivation, delivery of cross-invalidate or list notification commands, direct commands, responses and delivery of fencing commands.

Message-path identification and activation is performed by the CPU program to allow for selective configuration of links for communicating commands. Testing is performed for subsequent commands that are delivered on the message paths with execution permitted only for active paths. When an interface control check is presented for a command and it is discovered that a path is no longer operational, the path is inactive at the SES facility 16 and the non-operational path is deactivated by the program over an alternate path. Selection and operations of message paths is disclosed in U.S. patent application Ser. No. 07/860,800 filed Mar. 30, 1992, now U.S. Pat. No. 5,331,673 for "Integrity of Data Objects Used to Maintain State Information for Shared Data at a local Complex" by D. A. Elko et al U.S. patent application Ser. No. 07/860,797 filed Mar. 30, 1992, now U.S. Pat. No. 5,388,266 for "Management of Data Objects Used to Maintain State Information for Shared Data at a Local Complex" by J. A. Frey et al and U.S. patent application Ser. No. 07/860,647 filed Mar. 30, 1992, Now U.S. Pat. No. 5,394,542 for "Recovery of Data Objects Used to Maintain State Information for Shared Data at a Local Complex" by J. A. Frey et al all incorporated herein by reference.

Cache cross invalidation is performed by the SES facility 16 when, for instance, a write operation is executed for data in a SES cache 26 that is registered in one or more local caches 24A–24N. Before completing the SES write operation, the SES facility 16 sends a cross-invalidate signal to each system that contains a valid copy of the data in a local cache 24A–24N in order to maintain coherency of the local caches 24A–24N via a selected message path. This is disclosed in U.S. patent application Ser. No. 07/860,805 filed Mar. 30, 1992 pending for "Sysplex Shared Data Coherency Method and Means" by Elko et al incorporated herein by reference.

Notification of list-state transition is performed by the SES facility 16 when a list operation is executed that causes a list which was empty to become not empty or that causes a list (to be discussed in connection with FIGS. 4 and 6) which was not empty to become empty. In either case, a list-notification command is sent to each system that is monitoring the list, informing the system of the state transition. This is disclosed in U.S. patent application Ser. No. 07/860,809 filed Mar. 30, 1992 now U.S. Pat. No. 5,390,328 for "Method and Apparatus for Notification of State Transitions for Shared Lists of Data Entries" by J. A. Frey et al. incorporated herein by reference.

A fencing command, isolate or isolate using index, is issued by a program running on one CPC and is targeted to a system image located on a target CPC. Execution of the fencing command on the target CPC results in the isolation of the target system, or of a subsystem running on the target system, from resources shared by systems in a sysplex, that is, a system having multiple CPCs. This is disclosed in U.S. patent application Ser. No. 07/860,489 filed Mar. 30, 1992, now U.S. Pat. No. 5,384,554 for "Interdicting I/O and Messaging Operations in a Multi-system Complex" by D. A. Elko et al incorporated herein by reference. Fencing commands are routed to the target by sending the command to the SES facility 16, which forwards the command to the target system image.

The SES facility 16 continuously monitors the state of the physical links used to communicate commands by a message-path status table 43 of FIG. 3. Any failure, temporary or permanent, that may result in the loss of or change in the physical connection causes all the message paths associated with the physical link, as recorded in the message-path status table 43, to be placed in the inactive state. Commands are not sent on these links until the program has renegotiated the connections and reactivated the message paths. This prevents improper connections, such as from movement of cables, from causing commands to be incorrectly routed.

In addition to the SES monitoring function, the program may intentionally deactivate paths or change the associated system identifier. The SES facility 16 serializes these routing configuration changes against delivering new cross-invalidate, list notification or system fencing commands while the renegotiation is in progress.

The path-selection mechanism provided by the message path processor 35 is common to all forwarded and generated commands. The program negotiates the configuration and maintains the routing information independent of the specific command architectures. The command architectures interface with the path-selection mechanism by various means, including attach processing by the cache-structure and list-structure commands and command forwarding by fencing.

Fencing commands are sent from a message facility to the fencing facility by using an intermediate message processor in the SES facility 16 which forwards the command. The use of the intermediate message processor 36 avoids the need for direct connections among the CPCs in a sysplex.

FIG. 3 shows three CPCs and of the SES facility 16.

When a fencing command is received at the intermediate message processor, it is forwarded to the fencing facility 30. The path-selection function in the message-path processor 35 is invoked by the intermediate message processor 36 to deliver the fencing command to the specified system.

Figure 4:
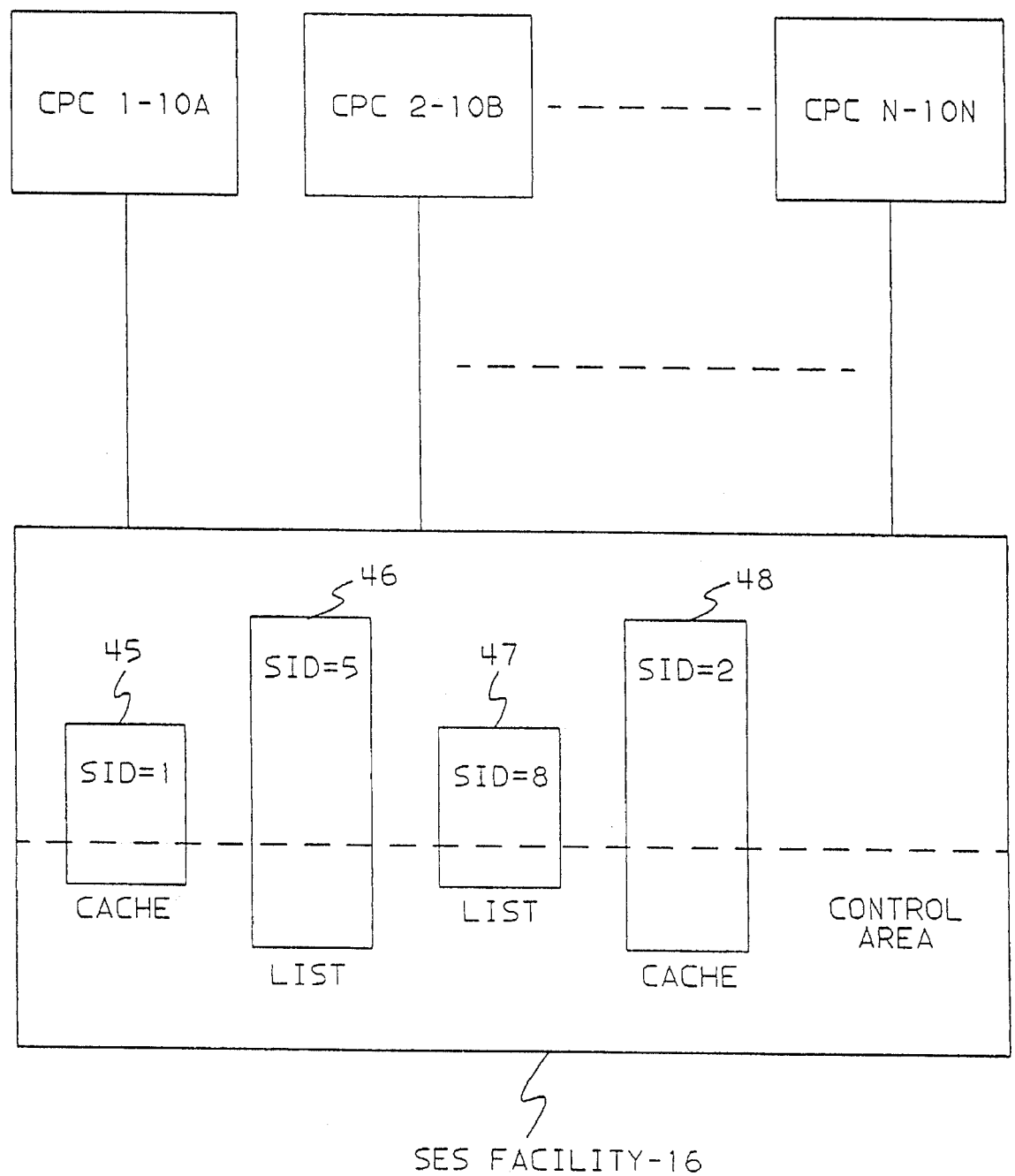
FIG. 4 is another portion of the system of FIG. 1 and shows multiple structures in a SES facility.

FIG. 4 shows a SES facility 16 having multiple structures 45–48. The message processor 37 provides the program with separate storage structures. Among these are the list structure (for example 46 and 47) and cache structure (for example 45 and 48). A set of commands is provided for each structure type, as well as additional commands for referencing global objects, to be discussed. The creation, deletion and attributes of a particular structure are controlled by the program through allocation and deallocation commands. FIG. 4 shows multiple structures of the same type which may exist concurrently. The allocated structures 45–48 reside in separate SES storage locations and are located by a structure identifier (SID). The SID value provides an identification of a target structure by a command. A command of a particular structure type, such as a cache-structure or list-structure command, may only address or alter the contents of a single structure of the given type.

SES storage contains data objects and control objects. The data objects may reside in any storage location, whereas the control objects are generally restricted to the control area.

Figure 5:
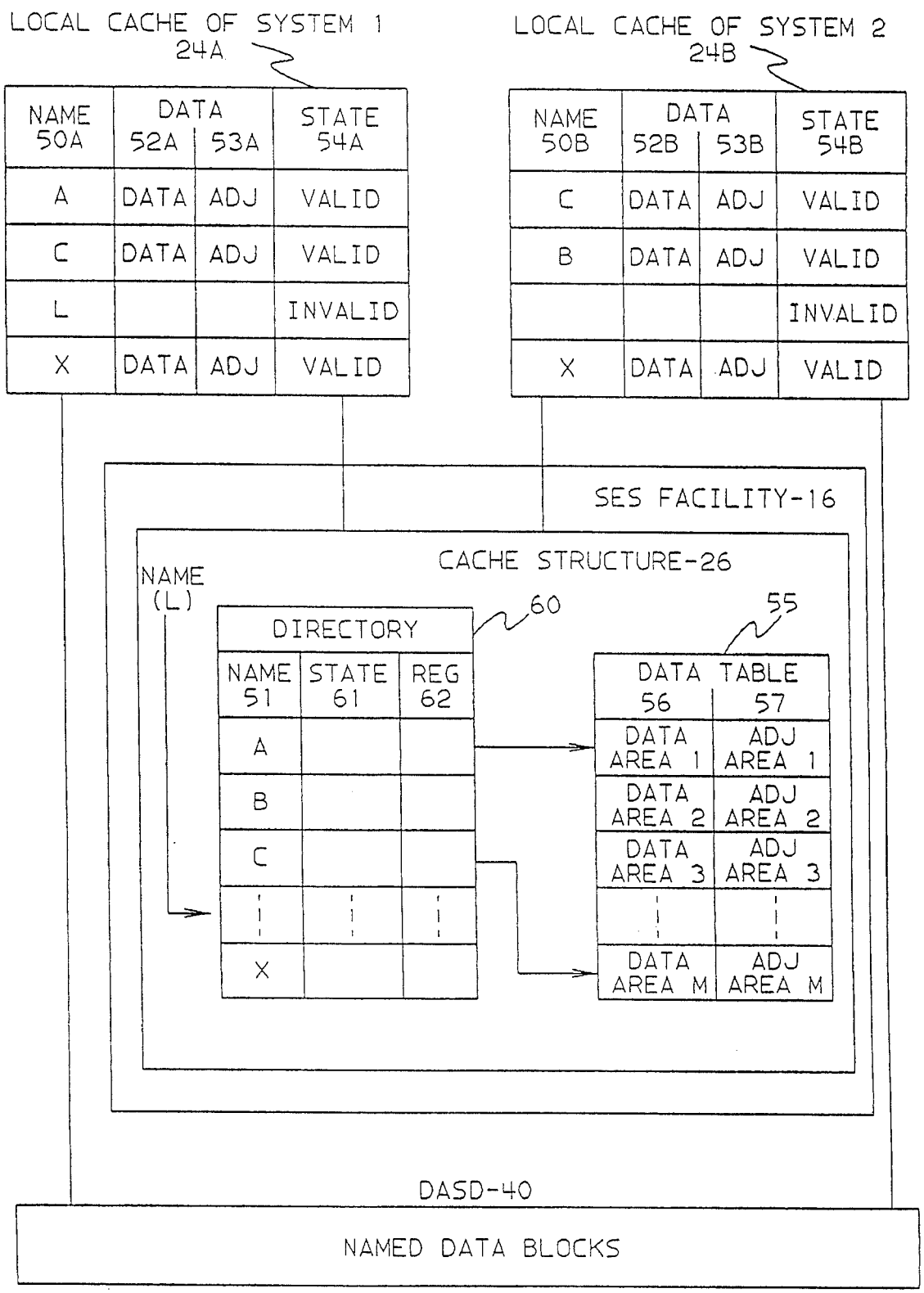
FIG. 5 shows the three-level storage hierarchy of the system of FIG. 1.
Figure 6:
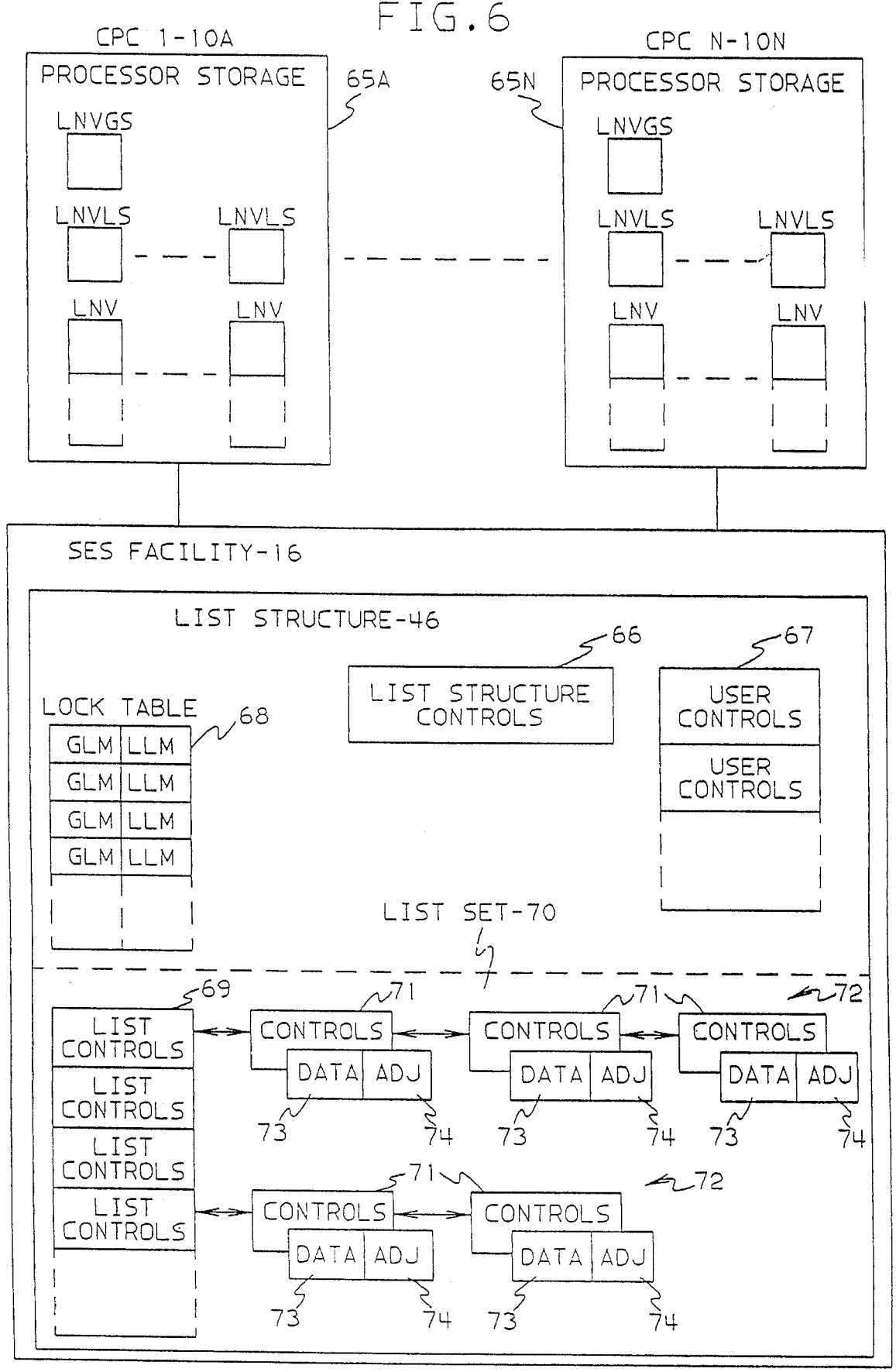
FIG. 6 illustrates one of the list structures of the structures shown in FIG. 4.

The partitioning of the SES storage and control area into structures as shown in FIGS. 4, 5 and 6 is managed by the program. The data objects are organized in tables or lists with an optional adjunct data area. The remaining objects are controls. The relative amounts of storage assigned to data and control objects are determined by program-specified parameters in the allocation commands. One of the cache structures 46 and 48 of FIG. 4 is shown as the SES cache 26 of FIG. 1.

As previously mentioned, each SES cache 26 of FIG. 1 is a component of a three-level storage hierarchy in a network of attached processors 10A–10N. FIG. 5 shows this hierarchy of storage. The lowest level of the hierarchy is DASD 40, the intermediate level is the SES cache 26, and the highest level is the local cache in processor storage. The DASD 40 and SES cache 26 are shared by the processors 10A–10N and are accessed by I/O operations and message operations, respectively. A local cache 24 is defined in each processor 10 and is accessed using CPU instructions.

As discussed in connection with FIG. 1, the processors 10A–10N are connected to the DASD 40 by I/O channels 15A–15N, and to the SES cache 26 by intersystem channels 18A–18N.

Referring to FIG. 5, data that moves through the storage hierarchy is given a name (columns 50A and 50B in the local caches 24A and 24B respectively, and column 51 in the SES cache 26). Data areas in the local caches 24A and 24B are shown in columns 52A and 52B, respectively, and optional adjunct data areas in the local caches 24A and 24B are shown in columns 53A and 53B, respectively. Each entry in the local caches 24A and 24B includes a state indicator shown in columns 54A and 54B, respectively. Each SES cache 26 may include a data table 55 which includes data areas (column 56) and adjunct data areas (column 57). The data sizes are variable with the range of variability being, in one embodiment, between 1 and n times the data-area element size. The data-area element sizes are fixed for each SES cache 26 and are powers of 2 with a minimum size of 256 bytes. An optional field of adjunct data may be associated with the data (columns 53A, 53B and 57). The names of the data (columns 50A, 50B and 51) are 16-byte values assigned by a programming protocol. The data is permanently resident in the DASD storage 40.

Copies or new versions of the data may also reside in any combination of SES-cache storage 26 and/or local-cache storage 24A and 24B. For instance, a data object may reside in SES-cache storage 26 and a subset of local caches 24A–24N, or it may reside in a subset of local caches 24A–24N but not in the SES-cache storage 26.

Each local cache 24A–24N is a processor storage area maintained by the program by utilizing the respective SES-support facility 33 on the CPC containing the local cache vector defined by a DEFINE VECTOR instruction. The DEFINE VECTOR instruction initializes controls in the SES-support facility 33 and assigns a local-cache token.

Each SES cache structure 26 is a structure in the SES facility 16 consisting of a directory 60 and, optionally, a data table 55 having a collection of data-area elements in columns 56 and 57. The directory 60 includes the name column 51 previously mentioned, and a state column 61 for indicating the state of each directory entry, and a register column 62 for pointing from each entry in the directory 60 to an entry in the data table 55. Each cache structure is designated by a structure identifier SID. Each SES cache structure in the SES cache 26 is created by an allocate-cache-structure command. The command is issued by an initialization procedure within the program which determines the attributes of the SES cache structure: size and number of data-area elements, number of directory entries, number of storage classes, and number of castout classes.

A local cache 24 is attached to the SES cache 26 by the attach-local-cache command that initializes controls in the SES facility 16 and associates the local cache with a set of paths over which the SES cache 16 issues generated commands to the SES-support facility 33, as discussed in connection with FIG. 2. A local cache 24 is attached to a SES cache structure 26 so that it may participate in the storage hierarchy. Coherency of copies of the data in the local caches 24A-24N and the the SES cache 26 is maintained by controls in the SES cache 26 and enforced by cross-invalidate commands issued as generated commands to the various SES-support facilities 33 in their respective CPCs 10A-10N. The building of a set of paths in the SES facility will be discussed herein.

The directory 60 is a collection of directory entries arranged as a fully associative array. The directory entries are partitioned into storage classes. The subset of changed directory entries is partitioned into castout classes. Whenever a named data object is placed in the higher two levels of the hierarchy (SES cache 26 and local cache 24) its state is recorded in the state column 61 and its location is recorded in the register column 62 by the SES-cache directory. State information indicates whether the data is changed, unchanged, or locked for castout, or resident in the SES-cache storage 26. Location information includes which of the local caches 24A-24N contains a copy. Certain SES-read and SES-write commands register the local-cache copy in the SES-cache directory. SES-write and SES-invalidate commands remove the registration and invalidate local copies.

When the data is located in the local cache 24, the state of the data is either valid or invalid. The valid state of local cache entries is maintained by controls in the SES-support facility 33. The data is validated by CPU instructions and invalidated by SES-write and SES-invalidate operations. The valid state of the data is tested by a CPU instruction. A valid named data object must be registered in the SES-cache directory 60 in order to maintain local cache coherency. Local-cache coherency is maintained by the invalidation process. A registered local-cache entry may test as invalid. This is referred to as overindication of the invalid state and is permitted. This is disclosed in the aforementioned U.S. patent application Ser. No. 07/860,800 now U.S. Pat. No. 5,331,673, incorporated herein by reference.

The SES-cache storage 55 is normally smaller than the DASD storage 40. Thus, periodically the changed data must be transferred from the SES cache 26 to the backing DASD 40. This process, called castout, is controlled by the program and involves the following operations:

A SES-read for castout operation is issued that sets the castout serialization and copies the data block to main storage which may or may not be put in the local cache 24.

An I/O operation is executed that copies the data block to DASD 40.

A SES-unlock castout locks operation is issued that releases the castout serialization.

Multiple castout processes may coexist for a single one of the local caches 24A-24N. Whenever data is locked for castout, an identifier for the local cache 24A-24N and an identifier for the castout process are placed in the directory 60. This is disclosed in U.S. patent application Ser. No. 07/860,806 filed Mar. 30, 1992 now pending for "Management of Data Movement from a SES Cache to DASD" by Elko et al incorporated herein by reference.

The least recently used unchanged data and directory resources are reclaimed by the SES cache 26 when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is maintained by the program. This is disclosed by U.S. patent application Ser. No. 07/860,807 filed Mar. 30, 1992, now pending for "Storage Element for a Shared Electronic Storage Cache" by Elko et al incorporated herein by reference.

FIG. 6 shows the connection of CPCs 10A-10N to the SES facility 16 wherein each CPC 10A-10N includes processor storage 65A-65N, respectively. The contents of one list structure 46 of FIG. 4 is shown in FIG. 6. It will be understood that the other list structures of the SES facility would be the same as the list structure shown in FIG. 6.

The list structure 46 comprises list-structure controls 66, user controls 67, and, optionally, a lock table 68, and/or a list set 70 with list controls 69 and list-entry controls 71.

Each lock table 68 consists of a sequence of one or more entries, which are numbered consecutively starting at zero. The list-structure type determines whether all the lock-table entries have a global-lock-manager GML object, a local-lock-managers LLM object, or both.

The list-structure controls 66 are initialized when the list structure 46 is created. The list-structure controls 66 contains attributes of the structure, such as the structure size, list-structure type, lock-table-entry count, nonzero-lock-table-entry count, lock-table-entry size, list count, list-element size, the list-set-entry count, user-identifier vector and user controls, shown separately at 67.

The user controls 67 are created and initialized when the list-structure user is attached. The user controls 67 contain a list-notification token, system identifier, user-attachment control, and user state.

The list set 70 includes one or more lists represented by list controls 69, which are numbered consecutively starting at zero.

There are list controls 69 associated with each list 72. The list controls 69 contain a list-entry count, a list-entry-count limit, a list-monitor table, a list-state-transition count, and a user list control.

Each list 72 consists of a sequence of zero or more entries. The list-structure type determines whether all the list entries in the list set 70 have a data list entry 73, an adjunct list entry 74, or both.

One of the mentioned list-entry controls 71 is associated with each entry of a list 72. The controls 71 contain list-entry-location information and other information for managing the data in the adjunct area 74.

The list commands provide a means for writing a lock-table entry: that is a command may compare global-lock managers GLM and conditionally replace a global-lock manager GLM, a local-lock manager LLM, or both the global-lock and local-lock managers GLM and LLM. The list commands also provide a means for reading an entry in the lock-table 68 or the next nonzero lock-table entry, or for clearing a lock table 68.

The list commands also provide a means for conditionally creating, reading, replacing, moving, or deleting one entry in a list 72. A number of comparisons may be requested during these processes. They include a list-number comparison, a version-number comparison, a global-lock-manager GLM comparison, or any combination of the preceding. Additionally, when global locks are compared, local locks LLM may be compared. A list entry may be moved from one list 72 to another within the same structure 46 or from one position to another within the same list 72. This is disclosed in U.S. patent application Ser. No. 07/860,655 filed Mar. 30, 1992 now pending for "Method and Apparatus for Performing Conditional Operations on Externally Shared Data" by D. A. Elko et al, incorporated herein by reference.

The position of a list entry in a list 72 is determined when it is created, and may be changed when any entry in the list is created, deleted or moved. A list entry or list-entry position is located within a list set 70 by means of a list-entry identifier, an optional list-entry name, or by position.

A list-entry identifier is unique to a list set 70 and is assigned by the SES facility 16. A list-entry name is unique to a list set 70 at any particular instant and is provided by the program. The position is specified by means of a list number, a direction, and an optional list-entry key.

When list-entry keys exist, the keyed list entries are ordered by key with the lowest numerical key at the leftmost position. Elements with the same key value may be located by first or last within the same key value.

When an unkeyed list entry is created or moved, the target list-entry position is always located by unkeyed position. When a keyed list entry is created or moved, the target list-entry position is always located by keyed position and first or last within the same key value.

The list commands also provide a means for synchronously writing and moving, moving and reading, or reading and deleting one entry of a list 72. More than one list entry may be deleted synchronously, and more than one data list entry 73 or adjunct list entry 74 may also be read synchronously. The data list entry 73 is always returned in the data area designated in main storage by the message-operation block. The adjunct list entry is returned in either the message-response block or the data area, depending on the command. This is disclosed in U.S. patent application Ser. No. 07/860,633 filed Mar. 30, 1992 now U.S. Pat. No. 5,410,695 for "Apparatus and Method for List Management in a Coupled Data Processing System" by J. A. Frey et al. incorporated by reference.

Normally, a data list entry 73 contains application-program data, and an adjunct list entry 74 contains the control data associated with it.

List monitoring is a SES list function which is optionally requested by a list-structure user by means of the attach-list-structure-user and the register-list-monitor commands. The attach-list-structure-user command identifies to the SES, the system on which the list-structure user resides and the list-notification vector LNV associated with the user. The register-list-monitor command allows the user to begin monitoring a list. This is disclosed in the aforementioned the aforementioned U.S. patent application Ser. No. 07/860,809 now abandoned incorporated herein by reference.

Each processor storage 65A–65N includes a list-notification-vector global summary LNVGS, multiple list-notification-vector local summary LNVLS entries, and multiple list-notification vectors LNVs. The list-notification vector LNV is created by the DEFINE VECTOR instruction. The sizes or the LNVs may vary among different list users. The LNV is attached to the SES list structure 46 by means of the attach-list-structure-user command. Each entry in an LNV may be associated with a list 72 in the SES list structure 46. List transitions from the empty to non-empty and non-empty to empty states are detected by periodically polling the appropriate entry in the LNV from the CPU. The TEST VECTOR ENTRY instruction is provided for this purpose.

A LNV entry is set to 1 as a result of a list transition to the empty state. It is set to 0 as a result of a list transition to the non-empty state.

For each LNV created on the CPC there exists a list-notification-vector local summary LNVLS. As a program specified option, the LNVLS is placed into the active state when any list-notification command is processed against the associated LNV indicating an empty to non-empty list transition. The LNVLS is not updated as a result of an non-empty to empty list state transition. The update of the LNVLS is specified through use of a list-notification command option. The LNVLS is tested by the TEST VECTOR SUMMARY instruction and set or reset by the SET VECTOR SUMMARY instruction.

On a CPC there exists one list-notification vector global summary LNVGS per CPC image. The LNVGS is not updated as a result of a non-empty to empty list state transition and is set when any LNVLS is set by a list-notification command. The LNVGS is tested by the TEST VECTOR SUMMARY instruction and set or reset by the SET VECTOR SUMMARY instruction.

When a user is monitoring a list, the empty to not-empty and not-empty to empty state transitions of the list result in the SES facility 16 issuing a list notification command to the system which initiated the user attachment.

The list-notification command causes the specified list-notification-vector LNV entry to be updated to reflect the empty or not-empty state of the monitored list 72. The list-notification command may also cause the specified list-notification-vector global summary LNVGS and list-notification-vector local summary LNVLS to be updated to reflect the not-empty state of the monitored list 72.

FIG. 7 is a block diagram showing a configuration having three CECs connected to a SES facility, the SES facility having a message path table and path-group table as they appear after the system has been initialized;

In U.S. patent application Ser. No. 07/860,380 now abandoned for "Communicating Messages Between Processors and a Coupling Facility" by D. A. Elko et al. incorporated herein by reference, a configuration is disclosed which enables a network of CECs to issue requests to and receive responses from a coupling facility. One such coupling facility is a structured external storage (SES) facility. Programming requires the ability to negotiate the link configuration with the SES when each system image is initialized, to renegotiate the link configuration following a recoverable link error, system failure, or physical-partitioning action on the CEC containing an active system image, and to recover commands that have been communicated to the SES but have failed to respond. In addition, programming can request operations to be performed in SES that generate commands to be issued by the SES to a system image residing on a remote CEC. Two such generated commands are cache cross invalidation, list-state transition notification. Fencing commands sent from a CPC to SES result in a forwarded command being sent from SES to the target CPC.

In support of these requirements, message paths are constructed for communicating commands and responses between an instance of an operating system and the SES. The following mechanisms exist for message paths; command request and response delivery, identification, activation, testing, deactivation, delivery of cross-invalidate or list-notification commands, and delivery of fencing commands.

Message-path identification and activation is performed by the program to allow for selective configuration of links for communicating commands. Testing is performed for subsequent commands that are delivered on the message paths with execution permitted only for active paths.

Cache cross invalidation is initiated by SES when a write or an invalidate operation is executed for data registered in a SES cache for one or more local caches. Before completing the SES write operation, the SES sends a cross-invalidate signal to each system that contains a valid copy of the data in a local cache in order to maintain coherency of the local caches via a selected message path. The cache architecture is described in U.S. patent application Ser. No. 07/860,805 now pending for "Sysplex Shared Data Coherency Method and Means" by Elko et al incorporated herein by reference.

List-state transition notification is initiated by SES when a list operation is executed that causes a list that was empty to become non-empty, or for a list that was non-empty to become empty. In either case, a list-notification signal is sent to each system that is monitoring the list informing the system of the state transition. List monitoring is described in U.S. the aforementioned U.S. patent application Ser. No. 07/860,809, now U.S. Pat. No. 5,390,329, now U.S. Pat. No. 5,390,329.

A system fencing command, isolate or isolate using index, is issued by a program running on one CEC and is targeted to a system image located on a remote CEC. Execution of the fencing command on the target CEC results in the isolation of the target system, or of a subsystem running on the target system, from resources shared by systems in a CPC network or sysplex. System fencing commands are routed to the target by sending the command to the SES, which intercepts and forwards the command to the target system image.

Programming protocols establish the correctness of the configuration, and provide unique names for the system images. Objects defined at the SES include:

Message path
  A representation of the set of hardware resources that connect a system image to a SES and can sustain a message operation. Multiple message paths may exist between a system image and a SES.

Message-path identifier
  The name assigned to a message path by the SES.

Node descriptor
  A world-wide unique identifier for a physical shared storage device. As is well known, the node descriptor is assigned at the time of manufacture and remains unchanged.

System identifier
  A program specified name for a system image. The system identifier designates the complete set of message paths that connect a system image with a SES. The system-identifier (SYSID) value remains unchanged while the system is active, even though the set of message paths may change.

Message-path status table
  The message-path status table contains state information for each message path. A message path exists for every potential source of system-initiated commands. The status for a message path includes: the message-path state (MPS) and the system-identifier value of the source system. A cross-reference listing of all active message paths with matching system-identifier values is also maintained, called the path-group table.
  The state is an indicator of whether the message path is in the active state or inactive state, as will be explained.

Programming interfaces are defined which support manipulation of these objects as disclosed in U.S. patent application Ser. No. 07/860,646 filed Mar. 39, 1992 now pending for Recovery of Resources in a Data Processing System having Storage Devices Sharing Data (Attorney Docket No. PO9-92-005), incorporated herein by reference.

Identify message path (IMP)
  The message-path identifier, the node descriptor, the message path state as registered at the SES, and message path request level are returned to the program. The node-descriptor value identifies the physical storage facility (SES) to the program and the message-path identifier identifies the logical path from the system image to the SES.
  The program retrieves the node descriptor, message-path identifier, and the mentioned message path state and message path request level (MPRL) from each message path defined to the subchannel used for communication with the SES. The MPRL indicates the maximum number of commands that may be processed concurrently for the message path. Retrieval occurs at the time of system initialization and following any link failure or physical reconfiguration. The node descriptor value must match across each path in the subchannel, and must be part of an installation provided list of node descriptor values that are associated with the system. Failure of any check will result in the message path remaining in an inactive state.

Activate message path (AMP)
  Once the message path connection has been validated by the program, the message path is placed in the active state for the system identifier specified on input. The AMP command is executed at the SES facility and places the path in the active state only if the Node ID and message path ID in the AMP command match the values at the SES facility. When activated, the message path may be used to send cross invalidates, list notifications and fence operations. When activated, the message path may be used to receive commands from and send responses to attached systems.

Deactivate message path (DMP)
  The message path designated by the input message-path identifier is placed in the inactive state. The DMP command is executed at the SES facility and places the path in the inactive state only if the Node ID in the DMP command matches the value at the SES facility. The message path is no longer used for cross invalidates, list notifications, or fence operations. The path is no longer used for receiving commands from or sending responses to attached systems when the path is in an inactive state.

Additional programming interfaces are defined for supporting the specific commands generated by SES. These are disclosed in U.S. patent application Ser. No. 07/860,805 now pending for "Sysplex Shared Data Coherency Method and Means" by D. A. Elko et al. incorporated herein by reference, These programming interfaces include:

Attach local cache
A local cache is attached to a SES cache and the system identifier is placed in the local-cache controls. The system identifier designates the set of message paths that can carry cross-invalidate signals to the attached local cache. The set of message paths is further restricted by the active state of the paths.

Attach list-structure user
A list-structure user is attached to a SES list and the system identifier is placed in the list-user controls. The system identifier designates the set of message paths that can carry list-notification signals to the attached list user. The set of message paths is further restricted by the active state of the paths.

Cache write operations
When SES write operations or cache invalidate operations occur, a cross-invalidate signal is generated for each system image containing a local cache that is registered in the cache directory. The system identifier is used to identify the set of paths from which an active message path is selected to send the cross-invalidate signal.

List operations
List operations to a SES list may change the state of the list from empty to non-empty or from non-empty to empty. When this occurs, a list-notification signal is issued to each system image containing a list-structure user that is registered in the list-monitor table. The system identifier is used to identify the set of paths from which an active message path is selected to send the list-notification signal.

Fencing operations
An isolate or isolate-using-index command contains the system identifier of the target system as an input parameter. The SES selects an active message path based on the value of the system identifier, and forwards the command to the target system image.

The SES continuously monitors the state of the physical links used to communicate commands. Any failure, temporary or permanent, such as loss of ligh, that may result in the loss of or change in the physical connection causes all the message paths associated with the physical link to be placed in the inactive state. Commands are not sent on these links until the program has renegotiated the connections and reactivated the message paths. This prevents improper movement of cables from causing commands to be incorrectly routed.

In addition to the SES monitoring function, the program may intentionally deactivate paths or change the associated system identifier. The SES serializes these routing configuration changes against delivering new cross-invalidate, list-notification or fencing commands while the renegotiation is in progress.

A sample configuration with three CECs running six system images is shown in FIG. 7. Each image in a CEC is identified by and image identifier (IID). A CEC may be running in either native mode or logically partitioned in a PR/SM environment, as is well known in the art. When a CEC is running in native mode, there exists a single IID, shown in FIG. 7, CEC A. When executing logically partitioned, one or more IIDs may exist, as shown in FIG. 7, CEC B and CEC C. The message-path status table is shown as it would appear after the systems had been initialized and each of the six message-path mechanisms is described with an example.

Entries in the message-path status table that contain information were initialized by a previous activate-message-path (AMP) command. Some have been subsequently deactivated by either the detection of link errors by the SES facility, or deactivate-message-path (DMP) commands initiated at the CEC. Entries with no information are available for activation, but no AMP command has yet been processed.

As an example of the identification mechanism, an IMP command is received from the system with SYSID=Z on path 14.3 at 80. A response is returned containing the node descriptor for the SES facility, message path identifier (MPID)=14.3, and an indication that the path is currently active.

As an example of the activation mechanism, an AMP command is received from the system with SYSID=A on path 16.2 at 81. Following successful command validatiion, message path 16.2 is activated, A/A is placed in the message-path-status-table entry at 82 and 16.2 is added to the path-group table for SYSID=A at 83.

As an example of the testing mechanism, a write-list-entry (WLE) command is received from the system with SYSID=R on path 7.0 at 84. The state of the message path is checked and, since the state is inactive at 85, the command is rejected. The program can either reactivate message path 7.0 or retry the command on message path 8.0 at 86.

As an example of the deactivation mechanism, the system with SYSID=X recovers for a failed command on message path 13.1 by issuing a DMP command with source IID=i and MPID=13.1. The DMP command is received on the alternate message path, 12.1 at 87 and is processed against the specified message path 13.1. 13.1 is placed in the inactive state at 88 and is removed from the path-group table for SYSID=X at 89.

As an example of path selection and signal delivery, a cache write operation updates a data entry in the cache, and using information in the cache directory, builds a list of local-cache entries in the CECs that need to be invalidated. As a result, An XI-command list is generated for sysids Z,A,R,Y at 90 and an XI command is delivered to each target system. Delivery is accomplished by selecting an active path in the path group, building an an XI command and issuing the command on the selected SCN.IID. The SYSID to be used for path group identification for each target system was previosuly saved in user controls based on the SYSID associated with the message path over which an attach local cache command was received for each attached user. This is shown for SYSID=Y at 93.

Delivery of an XI to a system is interlocked against AMP commands for the path group to ensure that the path group does not increase in size during the delivery operation. The write operation is completed when all intended processes of the XI commands have completed.

As a second example of path selection and signal delivery, a write-list-entry command causes a list to change from the not-empty to empty state and generates a list-notification (LN) command at 91 for each system that is monitoring the list for transitions. Delivery of the LN commands is accomplished to SYSID=Y and SYSID=B in the same manner as the delivery of the XI commands with the exception that processing of the write-list-entry command can complete prior to completion of the LN commands.

As an example of the delivery of fencing commands, an isolate-using-index command is received from the system with SYSID=R on path 8.0 at 92 that targets SYSID=Y. Path 8.0 is tested AT 86 as active, thereby permitting delivery of the command. The command is delivered to SYSID=Y by selecting a path from the path group for Y, (11.2) and forwarding command to CPC B on this path.

The message-path commands are used in recovery actions and in problem determination. The following are examples of their use.

1. The initial state of all message paths at the SES facility is inactive. During system initialization, the program tests the validity of the cabling network using the identify-message-path command. It uses the activate-message-path command to enable SES operations on the paths that are properly cabled.

2. When inactive path is indicated in the status conditions stored for a command, the path used for communication is in the inactive state. This may indicate that the cable used for the path has been reattached to another component of the installation. The program performs cable revalidation, as in the preceding item.

3. When the status for a SES operation indicates interface control check (IFCC), channel control check (CCC), or IPD machine check (see the IBM Enterprise System System/390 Architecture Principles Of Operation), the program uses identify message path to revalidate the cabling of the path used in the operation.

Figure 10A:
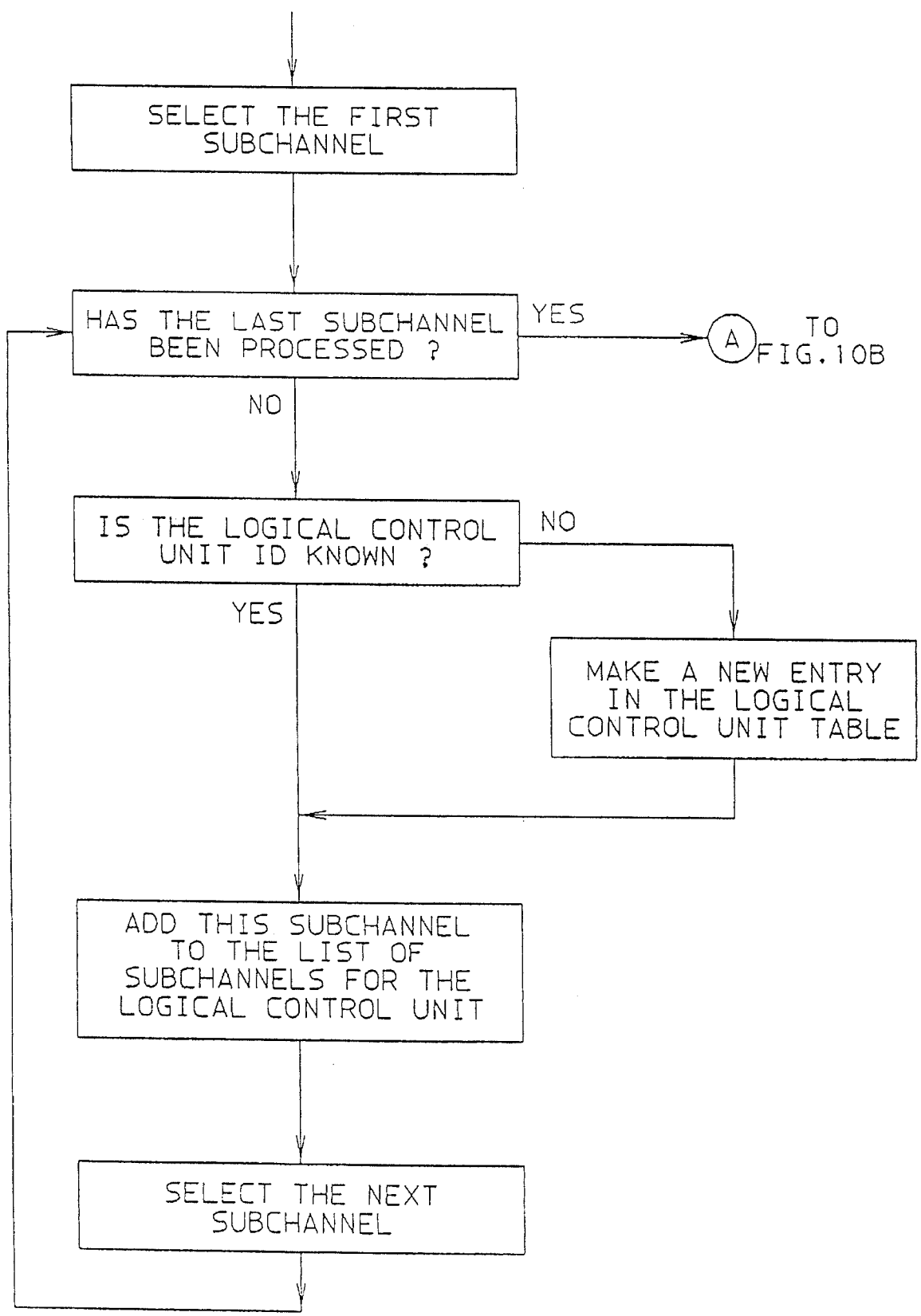
FIG. 10A–10C, taken together, form a flowchart of a initialization procedure for creating a control table which has an entry for each SES for identifying the subchannels to be used.
Figure 10B:
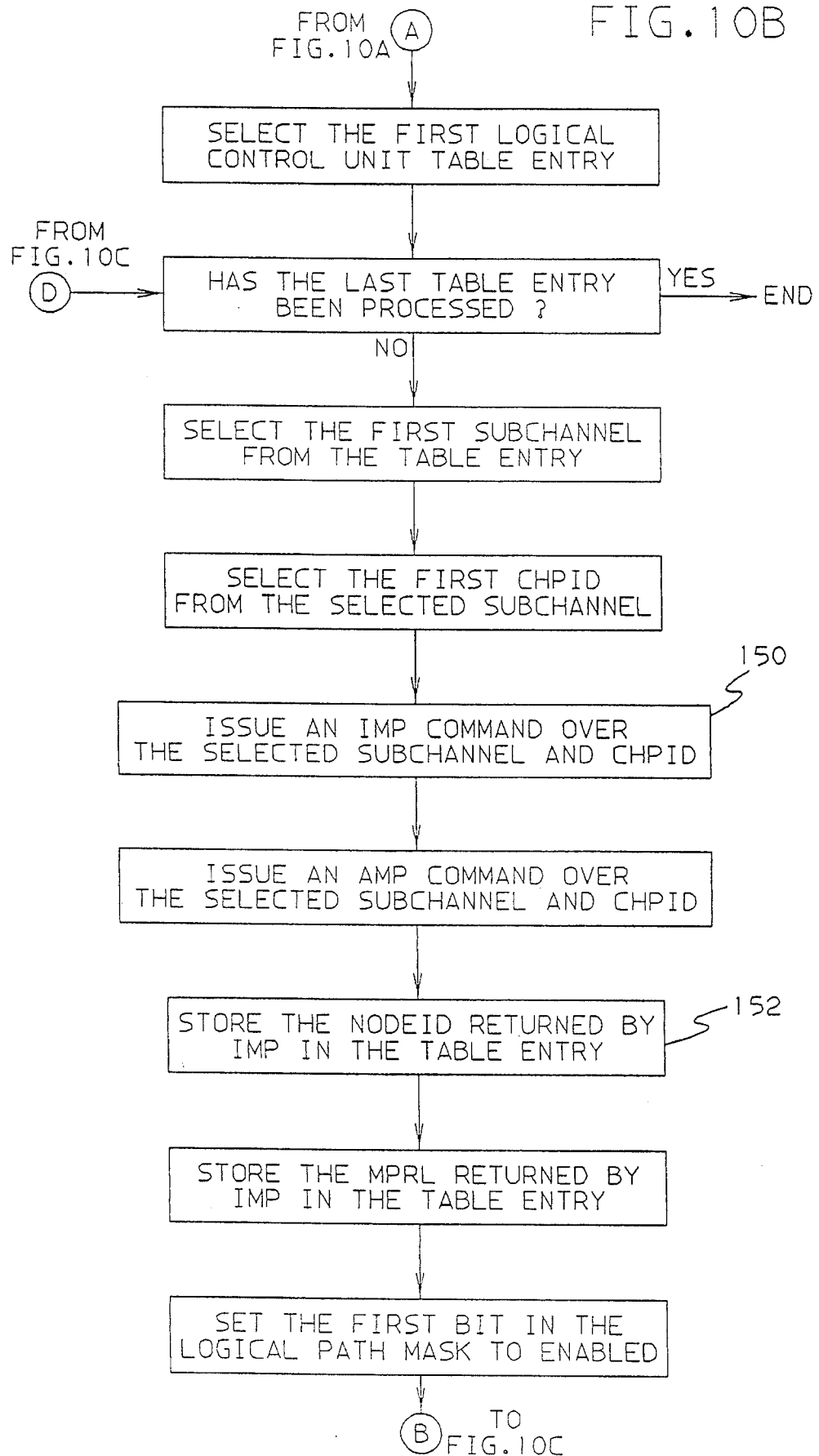
Figure 10C:
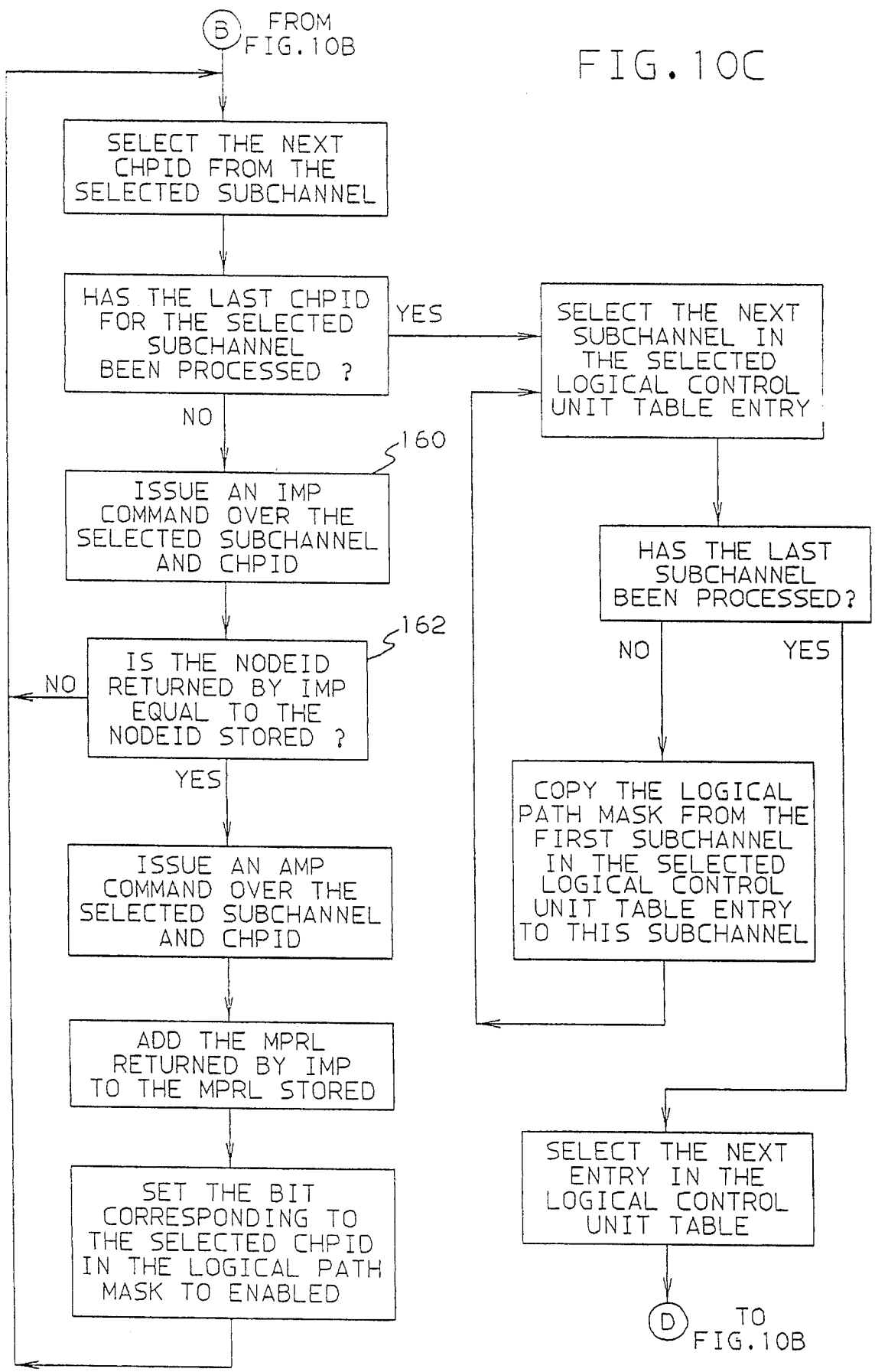

FIGS. 10A through 10C, taken together, form a flowchart of the system initialization wherein the initial configuration tables are built for later use in validating that the configuration is correct after cabling changes. At 150 of FIG. 10B, an IMP command on each CHPID of a subchannel identifies the node descriptors which are stored at 152 for later use.

Figure 8:
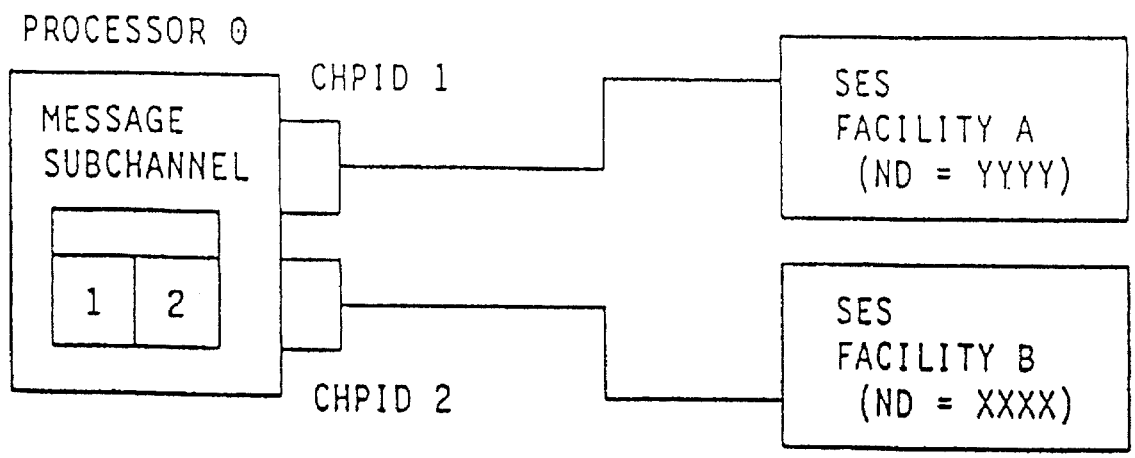
FIG. 8 is a block diagram of a portion of the data processing configuration of FIG. 1 showing the connection a message subchannel incorrectly cabled to two SES facilities.

Configuration errors can occur through cabling errors or incorrect specification of the I/O configuration data set (IOCDS). As shown in FIG. 8 channel paths 1 and 2 are designated at the subchannel, but they are are cabled to different SES facilities. A request issued using the subchannel can be routed to either SES facility, depending the CHPID selected for communication.

The message-path commands provide a means for detecting the configuration error. The following algorithm handles the problem.

As part of an initialization procedure, the operating system issues an identify-message-path command on each CHPID at the subchannel (see 160 of FIG. 10C). Then it compares the node descriptors that are returned at 162. If the node descriptors agree, then all of the paths are connected to the same SES facility. In any event, the valid paths for the subchannel are those with node descriptors that match.

Invalid message paths are not activated. The logical-path mask (LPM) used in message operations indicates only the valid paths.

In the interval between the completion of the identify-message-path command and the initiation of the activate-message-path command, a cable change might occur. Providing the node-descriptor and message-path identifier as operands for activate message path ensures that the change is detected.

Figure 9:
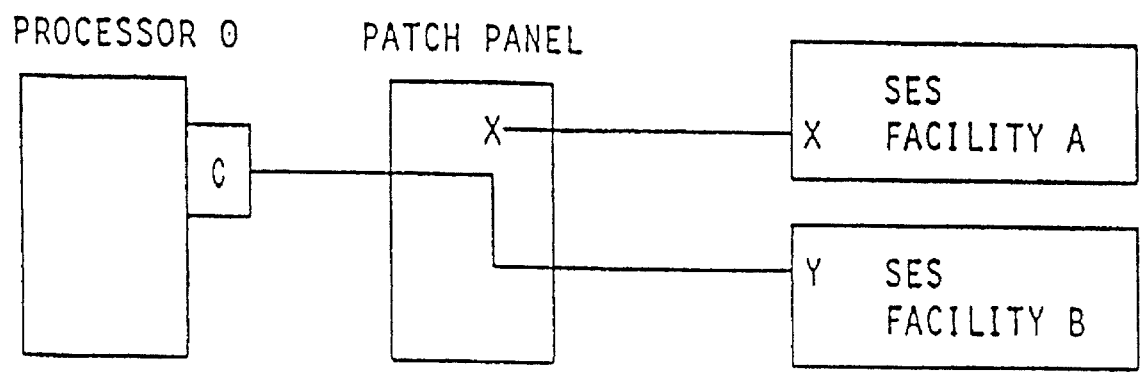
FIG. 9 is a block diagram showing how the connections of FIG. 7 might be made incorrect by the use of a patch panel.

FIG. 9 shows a configuration error that results when cables are swapped.

Initially, SES facility A is connected to processor 0 at CHPID C. A swap of the cables causes SES facility A to be disconnected from CHPID C and SES facility B to be connected. When the cables are swapped, the message paths become inactive. A subsequent request sent to SES facility A is directed to SES facility B, where it is suppressed with an inactive-path indication. The control program recognizes failure status in the message response block and issues an identify-message-path command. The node descriptor returned by the command does not match the original value, so the path is marked as invalid by the program. The corresponding bit in the LPM used for subsequent SES operations is set to zero.

The original SES request is retried. The setting of the LPM ensures that a different path is used.

While we have illustrated and described the preferred embodiment of our invention, it is to be understood that we do not limit ourselves to the precise construction or element (such as the SES facility) herein disclosed, and the right is reserved to all changes and modifications coming within the scope of the invention as defined in the appended claims.

Having thus described our invention, what we claim as new, and desire to secure by Letters Patent is:

1. A data processing system comprising:
   one or more central processing complexes (CPCs), each CPC including
   a central processor for executing programs for processing data, and
   a main storage for storing data, said programs, and at least one operating system;
   a coupling facility identified by a unique node identifier (NODEID);
   one or more message paths connected between said CPCs and said coupling facility, each message path connected to a CPC and said coupling facility for transferring messages including commands, data and responses between its connected CPC and said coupling facility, each message path connected between said CPCs and said coupling facility not transferring data until having been activated, and each message path being identified by a unique message path identifier (MPID) generated by and recorded in said coupling facility;
   a message-path status table in said coupling facility and connected to said message paths, said message-path status table having an entry for each of said message paths, each entry having status information;
   program means in said programs to be executed by said central processor in each CPC for sending, to said coupling facility via the connected message path, commands to be executed by said coupling facility; and
   command executing means in said coupling facility for executing said commands from said CPCs, said commands including commands for activating selected message paths such that activated ones of said message paths transfer data and responses between said CPCs and said coupling facility whereby status information is retrieved and set by said CPCs in said message-path status table.

2. The data processing system of claim 1 further comprising:
   specifying means in said program means in each CPC for specifying a system identification (SYSID) for each operating system; and
   associating means in said coupling facility for associating with each message path and recording the association in said coupling facility, the SYSID of the operating system connected by that message path to the coupling facility.

3. The data processing system of claim 2 wherein each entry of said message-path status table includes whether the message path associated with that entry is active or inactive and the SYSID of the operating system to which the message path is connected.

4. The data processing system of claim 3
wherein said commands executed by said command executing means in said coupling facility include pathing commands for activating, deactivating and identifying the message paths; and pathing command enabling means in said command executing means for enabling only the execution of said pathing commands for those message paths indicated as inactive by the status information in the associated message-path status table entry.

5. The data processing system of claim 4 further comprising:

means in said command executing means to reject all commands other than pathing commands received over inactive message paths.

6. The data processing system of claim 4 further comprising a path group table in said coupling facility for associating with each SYSID, a selected group of message paths connected to that SYSID.

7. The data processing system of claim 6 wherein said status information for each message path includes said MPID assigned to that message path and said NODEID for the coupling facility, and wherein said command executing means in said coupling facility includes means to execute an identify message path (IMP) command sent over a message path to said coupling facility, said command executing means including means for returning via the connected message path to the operating system sending said IMP command, said MPID, inactive or active status for the message path over which the IMP command was received, and said NODEID.

8. The data processing system of claim 7 wherein said status information for each message path additionally includes a message path request level (MPRL) for that message path for indicating the maximum number of commands that may be processed concurrently for that message path.

9. The data processing system of claim 7 wherein said command executing means in said coupling facility includes means to execute an activate message command (AMP) sent over a message path to said coupling facility, said AMP command including the SYSID of the operating system sending the AMP command and the NODEID, and said command executing means including means for setting the status of the message path over which the AMP command is received to active and for associating the SYSID sent with the AMP command with that message path.

10. The data processing system of claim 9 wherein said command executing means further includes AMP validation means for comparing the NODEID of an AMP command with the NODEID for the coupling facility, thereby validating that the message path remains connected to the same CPC previously issuing said IMP command to retrieve the NODEID provided with this AMP command.

11. The data processing system of claim 7 further comprising multiple coupling facilities, each coupling facility connected to selected ones of said CPCs by multiple message paths, and wherein said program means in a CPC includes message path grouping means for grouping the message paths connected to that CPC according to connected coupling facilities, message path initialization means for sending a first IMP command over a message path connected to said CPC, NODEID storage means for storing the NODEID returned by said IMP command for a coupling facility, group verifying means for sending a second IMP command over each message path in a group as determined by said message path grouping means and comparing the NODEID returned in response thereto with the NODEID in said NODEID storage means for that coupling facility to verify that the message paths in each group remain connected to the same coupling facility.

12. The data processing system of claim 6 wherein said command executing means in said coupling facility includes means to execute a deactivate message path (DMP) command sent over a message path to said coupling facility, and said command executing means further includes resetting means for resetting the status of the message path specified by the MPID provided on the DMP command to inactive.

13. The data processing system of claim 12 wherein said DMP command includes the NODEID from said NODEID storage means for the coupling facility whose message paths have been grouped by said message path grouping means, said command executing means includes DMP validation means for comparing the NODEID of the DMP command with the NODEID for the coupling facility, thereby validating that the message path remains connected to the same coupling facility, and said resetting means resets the message path status to inactive only if said validating means validates that the message path is still connected to the same coupling facility.

14. The data processing means of claim 6 further comprising:

error detecting means in said coupling facility for detecting errors on any one of said message paths;

message path means for making inactive the message path over which an error is detected by said error detecting means.

15. The data processing system of claim 6 wherein each CPC contains multiple images, each with its own operating system;

said program means includes means for associating at the CPC, each message path with the NODEID of the coupling facility to which the message path is connected, and said command executing means includes means for associating at said coupling facility, each message path with an image identification (IID) at the CPC for each operating system to which the coupling facility is connected.

16. The data processing system of claim 15 wherein said command executing means in said coupling facility includes means for executing an attach command received over one message path to said coupling facility, and said executing means further includes means for storing the SYSIO from said message path status table for said one message path in user controls for the user identifier specified in said attach command.

17. The data processing system of claim 16 wherein:

said program means includes means for sending a direct command to said connected coupling facility, said direct command affecting data stored in selected ones of said CPC images; and said command executing means generates generated commands responsive to said direct command, said generated commands being targeted to said selected ones of said CPC images, said command executing means further including message path selection means for selecting message paths connected to said selected ones of said CPC images for sending thereto one of said generated command.

18. The data processing system of claim 17 wherein said message path selecting means includes means for identifying the SYSID for each said selected CPC image from said user controls, said path group table includes groups of message paths to each IID by SYSID, and said message path selection means further includes means for using said path group table and said message path status table to send each of said generated commands over an active message path to the correct CPC image, said generated command specifying the IID of the target CPC image.

19. The data processing system of claim 6 wherein each CPC has at least one image having its own operating system and identified by an image identification (IID), and said message path status table further has an entry for each image to which a message path is connected in each of said message path entries.

20. The data processing system of claim 19 wherein each message path connected to said coupling device is connected to a channel identified by a channel number (CN), and said path group table further includes the CN and IID associated with each SYSID for targeting a particular image.

21. The data processing system of claim 15 wherein:

said program means includes means for sending a intermediate command to said connected coupling facility, and said command executing means forwards a forwarded command responsive to said intermediate command, said forwarded commands being targeted to said selected CPC image, said command executing means further including message path selection means for selecting message paths connected to said selected CPC image for sending thereto said forwarded command.

22. The data processing system of claim 21 wherein said path group table includes groups of message paths to each IID by SYSID, and said message path selection means further includes means for using said path group table and said message path status table to send generated commands over an active message path to the correct CPC image, said forwarded command specifying the IID of the target CPC image.

* * * * *